United States Patent [19]
Harden

[11] Patent Number: 5,398,770
[45] Date of Patent: Mar. 21, 1995

[54] CULTIVATOR

[75] Inventor: Jerrell W. Harden, Banks, Ala.

[73] Assignee: Brown Manufacturing Corporation, Ozark, Ala.

[21] Appl. No.: 879,318

[22] Filed: May 7, 1992

[51] Int. Cl.$^6$ .................. A01B 5/04; A01B 49/02; A01B 61/04
[52] U.S. Cl. .................. 172/149; 172/140; 172/146; 172/165; 172/175; 172/180; 172/194; 172/196; 172/690; 172/730; 172/266
[58] Field of Search .............. 111/120, 123, 124, 149, 111/152, 156, 147, 924; 172/139, 140, 144–146, 149, 165, 166, 174, 175, 180, 193–196, 519, 640, 689, 721, 730, 387, 392, 264–266

[56] References Cited

U.S. PATENT DOCUMENTS

| | | | |
|---|---|---|---|
| 749,960 | 1/1904 | Dodd | 172/195 |
| 2,713,299 | 7/1955 | Shager et al. | 172/195 |
| 2,952,322 | 9/1960 | Jurcheck | 172/196 |
| 3,207,234 | 9/1965 | Stewart | 172/519 |
| 3,830,311 | 8/1974 | Bryson | 172/393 |
| 4,187,916 | 2/1980 | Harden et al. | 172/146 |
| 4,267,783 | 5/1981 | Hendrix et al. | 172/196 |
| 4,407,207 | 10/1983 | Dreyer | 172/387 |
| 4,560,011 | 12/1985 | Peterson et al. | 172/744 |
| 4,580,507 | 4/1986 | Dreyer et al. | 172/266 |
| 4,601,248 | 7/1986 | Beasley . | |
| 4,729,435 | 3/1988 | Urich | 172/699 |
| 4,865,132 | 9/1989 | Moore, Jr. | 172/266 |
| 4,871,027 | 10/1989 | Lindstrom et al. | 172/165 |
| 4,909,335 | 3/1990 | Walt, Jr. | 172/166 |

FOREIGN PATENT DOCUMENTS

| | | | |
|---|---|---|---|
| 799190 | 11/1968 | Canada | 171/147 |
| 2046562 | 11/1980 | United Kingdom | 172/196 |
| 1095892 | 6/1984 | U.S.S.R. | 172/144 |
| 1530108 | 12/1989 | U.S.S.R. | 172/699 |

OTHER PUBLICATIONS

Hiniker, "5000 Cultivator" brochure, Dec. 1988.
Farm Industry News, vol. 22, No. 4 Mar. 1989 p. 48, "Krause".
Farm Industry News, Nov. 1990, "Level Headed".
Orthman Manufacturing, Inc. Brochure, 1985 (one page).
Landoll Corp. Brochure Model 2000 Rowcrop Cultivator.
Kelley Manufacturing Co. (KMC) Brochure High--Residue Cultivator.
White-New Idea Farm Equipment Co. Brochure 379 No-Till/Conventional Till Row Crop Cultivator.
Tebben Manufacturing Brochure Cultivator Shields.

Primary Examiner—Dennis L. Taylor
Assistant Examiner—Spencer Warnick
Attorney, Agent, or Firm—Sterne, Kessler, Goldstein & Fox

[57] ABSTRACT

A chisel cultivator for post-planting cultivation. The cultivator includes a main frame. A chisel member has one end portion coupled to the frame and a second end portion spaced from the first end portion along a longitudinal axis of the chisel member for cultivating sub-surface soil during operation of the cultivator. A heave limiter is coupled to the frame ahead of the chisel member relative to the direction of operation of the chisel cultivator. The chisel member is adjustable relative to the frame to adjust the distance of the second end portion of the chisel member from the frame. A sweep assembly is coupled to the frame behind the chisel member relative to the direction of operation of the chisel cultivator. The sweep assembly includes wings which extend outwardly of a centerline extending in the direction of operation of the chisel cultivator in a plane substantially orthogonal to the longitudinal axis of the chisel member.

21 Claims, 5 Drawing Sheets

CULTIVATOR

FIELD OF THE INVENTION

This invention relates to agricultural equipment. More particularly, it relates to cultivators. Still more particularly, it relates to cultivators that work the soil to permit increased crop growth and to inhibit weed and grass growth.

BACKGROUND OF THE INVENTION

Cultivators to work the soil have been known for many years. From earliest times, farmers have cultivated the soil in an effort to prevent weed and grass growth that compete with crop growth for moisture and nutrients. Animal drawn single row cultivators have been in use for thousands of years. Multi-row cultivators came into more widespread use with the advent of the mechanized age. Today, tractors are used to pull multi-row cultivators through fields. To date, the cultivators in use have all had one or more disadvantages which prevent optimum cultivation and plant growth.

In today's mechanized farming environment, seed beds are prepared and seeds planted in the beds by tractor drawn implements. Generally, one or more rows of bed preparers/planters are drawn through a field. In a single operation, they open a bed, plant the seed, and cover the planted seed. One such apparatus is described in detail in U.S. Pat. No. 4,187,916, issued Feb. 12, 1980, to J. Harden et al. Another such "single pass" planter is shown in U.S. Pat. No. 4,601,248, issued Jul. 22, 1986, to E. Beasley. Planters of the type shown in the Harden '916 and Beasley '248 patents should not be confused with cultivators, however, which are used to cultivate the soil in an already planted field.

As tractors and equipment travel over the field, they pack down the earth between the seed bed rows. This results in the creation of densely compacted soil at and several inches below the earth surface. The compacted soil inhibits plant growth; plant roots are restricted from penetrating the condensed, packed earth between the plant rows. The plant roots are therefore unable to gain full access to and the benefit of the surface and sub-surface areas that could otherwise provide water and other nutrients to the plant roots.

Known cultivators have been used almost exclusively to try to control the growth of weeds and grasses, which are the "enemy" of crops. Conventional cultivators are designed to plow between crop rows (in the "row middles") at very shallow depths to kill weeds and grass. They do this by cutting the weed and grass plants loose from their roots just below the earth's surface. Existing cultivators only loosen up the top 1"-2" of soil. With sun beating down on the field, this top part of the soil becomes the hottest part of the soil. Surface temperatures can rise to 130°-140° F. This causes the surface soil to dry out quickly and bake any plant roots growing near the surface.

In conventional farming, using known cultivators, the row middles, even after cultivation, are so tightly packed that rain water cannot penetrate the soil to a depth at which roots could be expected to grow. Rainwater therefore merely runs off the field into the drains and rivers, carrying with it valuable nutrients, such as fertilizers and pesticides. This not only robs the crops of needed nutrients, but it also adds to environmental problems and creates additional pollution of the creek and river waters.

Known cultivators generally have "sweeps" or wing-like members which are dragged by a tractor or the like through the ground just below the surface of the row middle. Sweep assemblies are well known in the agricultural industry. Kelly Manufacturing Corporation, of Tifton, Ga., manufactures a line of cultivators with sweep assemblies.

Known cultivators used in "conventional farming" environments (in which the remains of a winter cover crop or a previous year's crop residue have been cleared from the field before the current planting season, such remains being generally known in the agricultural industry as "trash") may have three to five or more sweeps for each row middle. Conventional fanning cultivators will also usually have one or two coulters for the entire assembly for stability.

Known cultivators used in "no-till" farming (in which the trash is left undisturbed in the field) consist of two (or three) elements for each row: a coulter and a single large sweep (and a gauge wheel, which controls the depth of the sweep). Each sweep will generally have a span of 28"-32". It has been found in practice that it is very difficult to get such a large sweep to go into the ground in the first place and then keep it in the ground at the desired depth for cultivating the soil.

Known cultivators rely on the weight of the cultivator unit (alone or with the weight of the tool bar added) to provide the force necessary to drive the sweeps into the ground. This is a problem when the ground consists of hard earth or the density of the soil is uneven (having randomly located hard and soft spots). The sweeps will often pop out of the ground when they hit a hard spot. Or they will drive deeply into the softer ground, going under the weed and grass plants, thereby missing them entirely.

When cultivating fields planted with crops like corn, soybeans, or cotton, the cultivator is set to throw dirt onto the crop row itself at the base of the crop. This is done to cover up the weeds and grasses that are growing in the crop row and which therefore cannot be cut without also cutting the crop plants. However, when working in fields planted with peanuts, for example, the cultivator must be set to keep from throwing dirt onto the crop row.

As will be described in detail below, the present invention overcomes the deficiencies of and problems associated with the conventional technology noted above.

SUMMARY OF THE INVENTION

The present invention is directed to a chisel cultivator. The cultivator includes a main frame. A chisel member has one end portion coupled to the frame and a second end portion spaced from the first end portion along a longitudinal axis of the chisel member for chiseling the compacted soil between crop rows during operation of the cultivator. A heave limiter is coupled to the frame ahead of the chisel member relative to the direction of travel of the chisel cultivator. Means are provided for adjusting the chisel member relative to the frame to adjust the distance of the second end portion of the chisel member from the frame and thus the depth of penetration of the chisel into the ground. A sweep assembly is coupled to the frame behind the chisel member relative to the normal direction of travel of the chisel cultivator. The sweep assembly includes wings which extend outwardly of a centerline extending in the direction of travel of the chisel cultivator in a plane substantially orthogonal to the longitudinal axis of the chisel member.

In addition, means may be provided for adjusting the sweep assembly relative to the frame in a direction substantially parallel to the longitudinal axis of the chisel member. A coulter assembly may also be coupled to the frame ahead of the heave limiter relative to the direction of travel of the chisel cultivator.

FEATURES AND ADVANTAGES

The present invention has a number of features and advantages which distinguish it over known cultivators.

The cultivator of this invention loosens the soil to a much greater depth than known cultivators. This results in a greater volume of soil that remains moist and which is accessible to the plant roots.

The cultivator of the invention removes most of the traffic compaction in the topsoil between the crop rows in the entire field to permit plant root growth over the entire topsoil surface of the field. This gives the plant roots access to all of the nutrients in the entire field.

The cultivator of the invention loosens up the soil enough to soak up rain water, thereby preventing runoff and minimizing the negative environmental impact on existing water supplies. In other words, this cultivator opens up a larger reservoir in the soil than was heretofore obtainable with existing cultivation equipment.

The chisel creates a downward force on the entire unit. In the process, it breaks up and loosens the compacted soil. This gives the sweep soft ground in which to run. In normal operation, therefore, the sweep never sees hard and soft spots; it only sees soft ground. The result is that very little downward force is required to keep the cultivator operating at the desired level of penetration. The heave limiter wheel serves both as a depth guage wheel and, due to its placement relative to the chisel point, creates an opposing force to the chisel causing the soil to be crushed as it is forced upward, since it cannot move upward due to the heave limiter wheel. This reduces ground heave, clodding, and soil displacement such that, when herbicide is applied before cultivation, it is not disturbed by the cultivation and falls back into place because of the lack of disturbance created by the chisel.

BRIEF DESCRIPTION OF THE DRAWING

The invention will be better understood with reference to the accompanying drawings in which.

DESCRIPTION OF THE PREFERRED EMBODIMENTS

The cultivator of this invention will be described in detail below with reference to the presently preferred embodiments thereof. Two embodiments of the cultivator of this invention are shown in some detail, although it will be apparent to those skilled in the relevant art that some features which are not relevant to the invention may not be shown for the sake of clarity.

Figure 1:
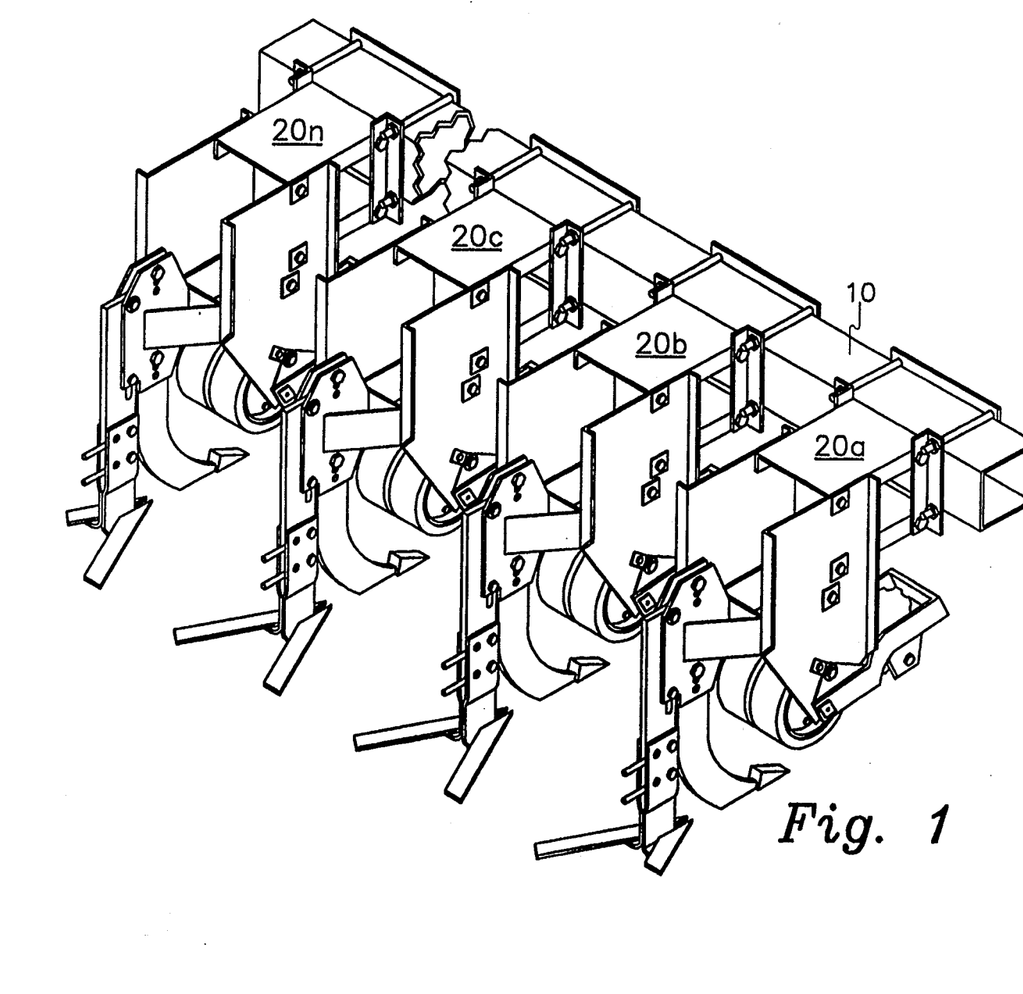
FIG. 1 shows a rear perspective view of multiple rows of a first embodiment of the cultivator mounted to a common mounting bar.

Referring first to FIG. 1, a common mounting or tool bar 10 mounts a plurality of cultivators 20a, 20b, ..., 20n. The tool bar 10 in turn mounts to a tractor hitch (not shown) in a conventional manner. Any number of cultivators may be mounted to the tool bar 10. The number of cultivators used is a function of the size of the tractor and the field being cultivated. As few as three and as many as twenty-five or more cultivators are quite typical. The separation between adjacent cultivators is a function of the plant row spacings. The cultivators 20 are designed to cultivate the earth in the row middles between the plant rows for purposes explained below. In the following description, each cultivator 20 may sometimes be referred to as a "row unit."

Figure 2:
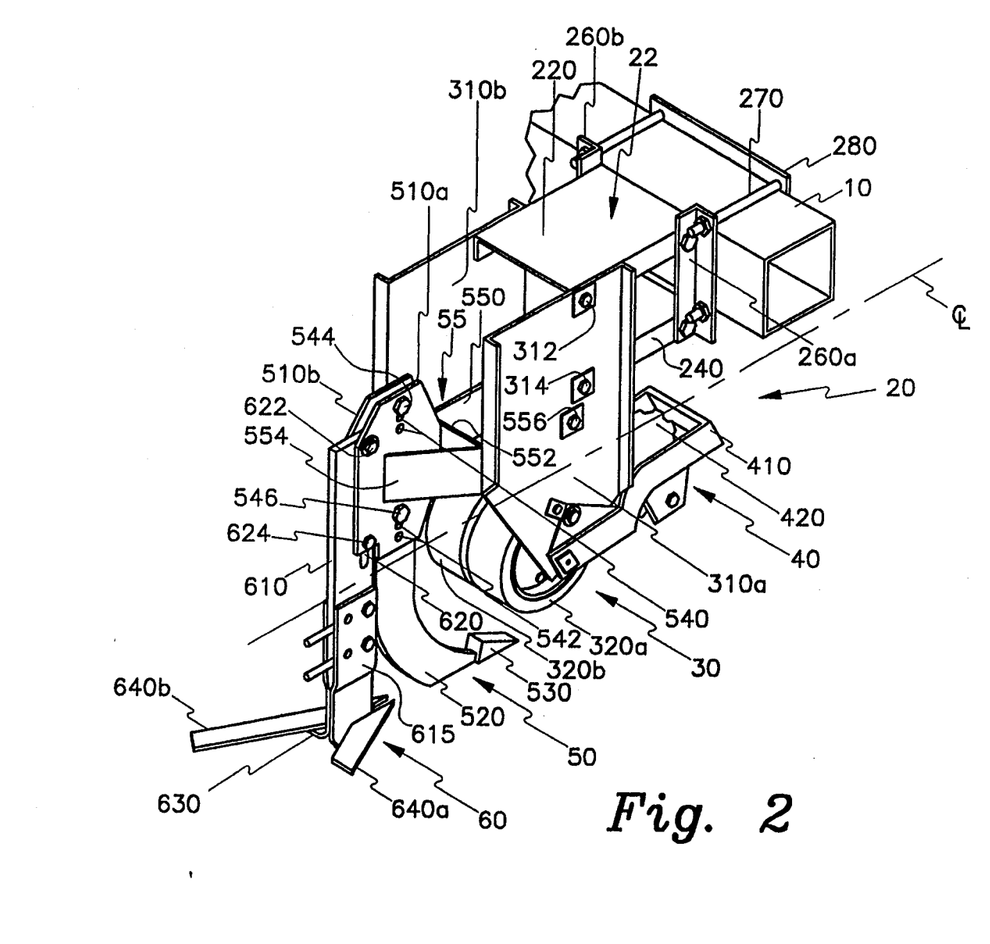
FIG. 2 shows a rear perspective view of one row of the cultivator assembly of FIG. 1.
Figure 3:
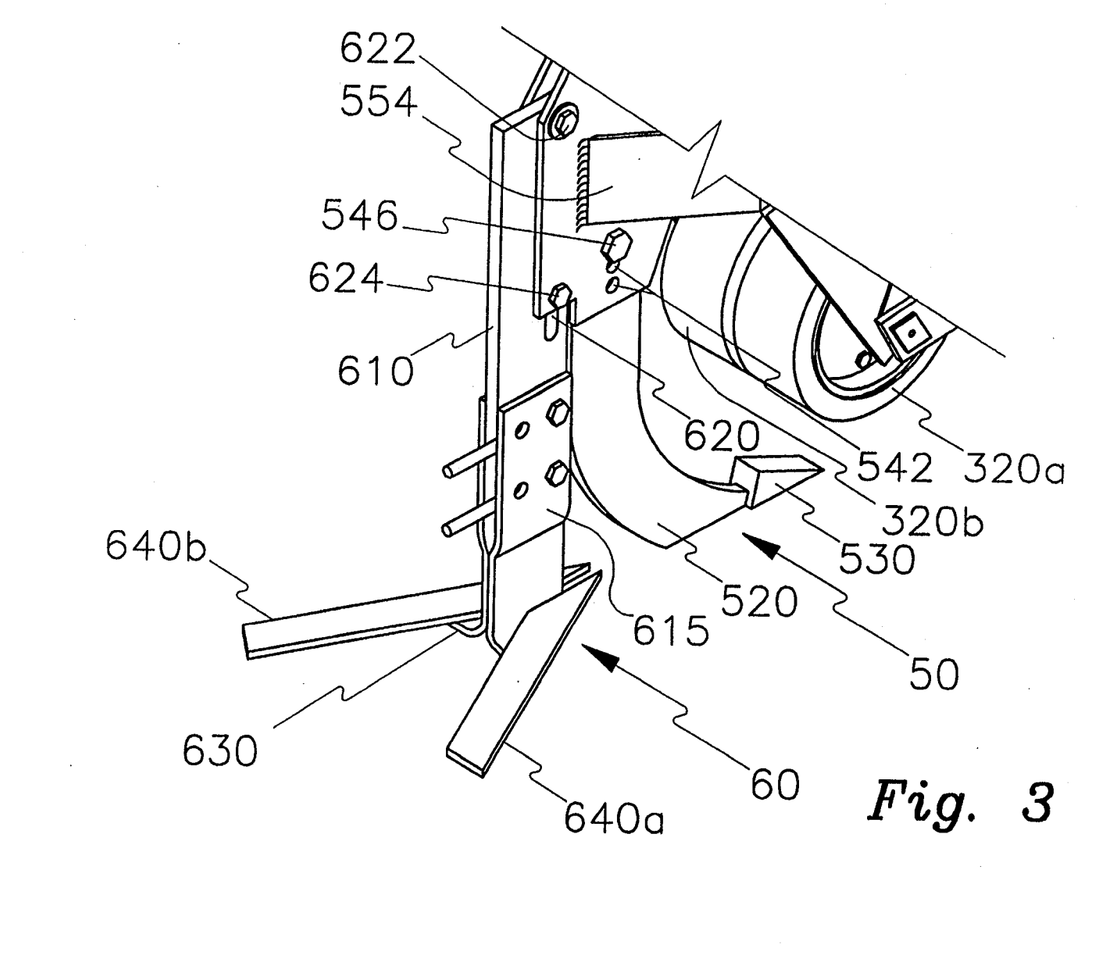
FIG. 3 shows a detail view of the chisel and sweep assembly of the first embodiment.

FIG. 2 shows an enlarged view of one cultivator row unit assembly of one presently preferred embodiment of this invention. Except as noted below, all row units are structurally and functionally similar. As shown, a cultivator 20 has a flex linkage assembly 22, which comprises a top frame member or plate 220 and a bottom frame member or plate 240. Right and left side spacer members 260a, 260b are fixed to both the top plate 220 and bottom plate 240. (In this description, terms such as "right," "left," "top," "bottom," "upper," and "lower" are used with reference to the unit as shown in the drawing figures. They are used for convenience of description only; they have no other special significance to the invention.) The frame members 220, 240 and spacer members 260a, 260b form a vertically flexible mounting assembly for the several cultivator elements of this invention.

In the embodiment shown in FIG. 2, a mounting member 280 is releasably connected to side spacers 260a, 260b in a known manner (for example, by bolts 270). Side spacers 260a, 260b and mounting member 280 cooperate to mount the cultivator assembly 20 to the tool bar 10 by providing a vice-like grip against the tool bar 10 as the bolts 270 are tightened to secure the cultivator assembly 20 to the bar 10. This arrangement allows the cultivator or row unit 20 to be moved laterally (right and/or left in the drawing) to adjust the spacing between adjacent cultivators. It will be apparent to those skilled in the relevant art that other means may be used to secure the cultivator 20 to the tool bar 10. These would include, but are not limited to, welding or bolting the side spacers 260a, 260b directly to the bar 10. Some of these alternate mounting means would inhibit the adjustability of the row units, however.

Figure 4:
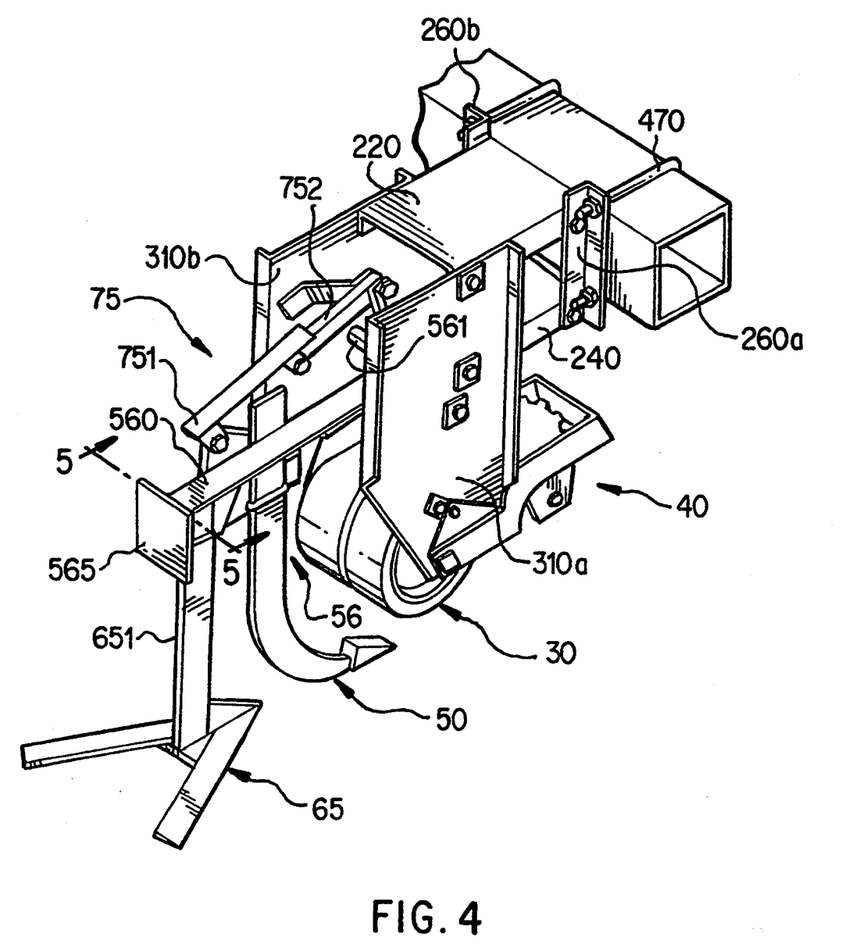
FIG. 4 shows a rear perspective view of one row of a second embodiment of the cultivator of this invention.

Another variation on the mounting assembly is shown in the embodiment of FIG. 4. Here, a pair of U-shaped members 470 replace the plate 280-bolt 270 combination to achieve the same mounting effect.

The cultivator 20 further includes a heave limiter assembly 30. The heave limiter assembly 30 comprises heave limiter frame members 310a, 310b. The right and left side heave limiter frame members 310a, 310b have upper or proximal portions fixed to the right and left sides of the top frame plate 220 and bottom frame plate 240, respectively. Heave limiter frame members 310a, 310b extend downwardly from the frame plates 220, 240. In the embodiment shown in FIG. 2, pairs of upper and lower bolts 312, 314 bolt the heave limiter frame members 310a, 310b to the cultivator frame members 220 and 240, respectively. It will be apparent to those skilled in the relevant art that heave limiter frame members 310a, 310b could also be welded or otherwise secured to the frame members 220 and 240.

A pair of heave limiter wheels 320a, 320b are mounted on an axle (not shown) to the lower or distal end portion of the heave limiter mounting members 310a, 310b. Heave limiter wheels 320a, 320b are preferably rubber tired wheels independently and freely rotatably mounted on a common axle and spaced slightly apart from each other. It is contemplated that other heave limiter wheel arrangements could be used, such as a single wheel, or two or more wheels fixed to the axle for common rotation. Other wheel materials are also contemplated, such as neoprene.

The cultivator 20 also preferably includes a front coulter assembly 40. Coulter assemblies are well known per se; one example is shown in the above-mentioned Harden et al '916 patent. The coulter assembly 40 is preferably mounted to the unit via the heave limiter assembly 30. The coulter assembly 40 includes a substantially U-shaped front coulter frame 410 which is mounted to the lower or distal end portion of the heave limiter frame members 310a, 310b. The front coulter frame 410 extends forwardly (in the normal direction of movement of the cultivator assembly) of the heave limiter assembly 30. A front coulter 420 is rotatably mounted to and between the legs of the coulter frame 410.

A chisel assembly 50 is mounted to the cultivator 20 rearwardly (in the normal direction of movement of the cultivator) of the heave limiter assembly 30. In the embodiment shown in FIG. 2, the chisel assembly 50 comprises a pair of right and left side chisel frame members 510a, 510b. A chisel shank member 520 is secured between and extends downwardly from chisel frame members 510a, 510b. A chisel member 530 is mounted to (or formed integrally with) the lower or distal end of the chisel shank 520. The chisel member 530 extends forwardly of the main body of shank 520. The chisel normally sits under the heave limiter wheels 320a, 320b. Depending on, among other things, soil conditions, the chisel may be located somewhat forwardly of, directly under, or somewhat behind the center of the heave limiter wheels.

The chisel frame members 510a, 510b each have a plurality of spaced apart upper and lower adjustment holes 540, 542. In operation, the chisel extends below the surface of the soil to break up and loosen compacted soil. Adjustment holes 540, 542 mate with matching holes (not shown) in the chisel shank 520 to provide for vertical adjustment of the shank 520 and chisel 530 relative to the depth of chisel penetration into the ground. Mounting bolts 544, 546 extend through matched holes to secure the chisel shank 520 to the frame members 510a, 510b at the desired depth setting. In the presently preferred design of this embodiment, the sets of adjustment holes 540, 542 are spaced apart about 1.5". This allows a maximum vertical adjustment of the shank 520 of about 3". It will be apparent to those skilled in the relevant art that other hole spacings could be used.

In the embodiment shown in FIG. 2, a chisel mounting assembly 55 pivotably mounts the chisel assembly 50 to the heave limiter assembly 30. The chisel mounting assembly 55 comprises a pair of longitudinally extending frame members 550 (only the left side one of which is shown in FIG. 2) and a transverse plate member 552. Each frame member 550 has a rearwardly extending, inwardly angled portion 554 (only the right side one of which is shown in FIG. 2). The longitudinally extending frame members 550 are pivotably mounted to the heave limiter frame members 310a, 310b by a mounting bolt 556. The chisel frame members 510a, 510b are fixed (for example, by welding or bolting) to the inwardly angled extensions 554 and to a rearmost one of transverse plate members 552.

The cultivator 20 also includes a sweep assembly 60. The sweep assembly 60 is mounted to the cultivator 20 behind the chisel assembly 50. In the embodiment shown in FIG. 2, the sweep assembly 60 comprises a sweep mounting member 610. Mounting member 610 is adjustably mounted to chisel frame members 510a, 510b. A pair of slots 620 (only the lowermost one being shown in FIG. 2) align with bolt holes in chisel frame members 510a, 510b to permit mounting member 610 to slide up and down for vertical adjustment relative to the ground. Upper and lower mounting bolts 622, 624 pass through the upper and lower slots 620 and associated mounting holes (not shown) in chisel frame members 510a, 510b, respectively, to secure the sweep mounting member 610 and thus the entire sweep assembly 60 to the chisel assembly 50.

Sweep mounting member 610 has a lower extension portion 615, the lower end part of which flares out to form sweep wing support plates 630. A pair of generally swept-back sweep wings 640a, 640b rest on support plates 630 and are secured (for example, by welding) to the extension portion 615 of the sweep mounting member 610. Wings 640a, 640b extend laterally out from the cultivator centerline CL. The number and spread of the wings 640a, 640b will vary as a function of the width of the path between adjacent crop rows and/or of the coverage desired between adjacent cultivator rows.

The embodiment shown in FIG. 4 incorporates a modified form of the chisel mounting assembly. In this embodiment, the chisel mounting assembly 56 comprises an elongated member or plow beam 560 which extends longitudinally between heave limiter frame members 310a and 310b. The plow beam 560 is pivotably mounted about a pivot axis 561. As shown in the cross-sectional view of FIG. 5, the plow beam comprises a pair of angle members 562 and 563, each having a vertical face 562a and 563a, respectively, and a horizontal face 562b and 563b, respectively. The vertical faces 562a and 563a are laterally offset from each other by a distance just greater than the thickness of the chisel shank portion 520 to define a lateral space S. A plurality of plow beam angle supports 564 extend between and are secured (e.g., by welding) to angle members 562 and 563 to provide torsional strength to the plow beam. The supports 564 are notched at the top and bottom to allow them to slide over the vertical surfaces 562a and 563a along the lengths of members 562 and 563, respectively, for proper positioning prior to securing them in place. An end plate 565 is secured (e.g., by welding) to the end of the plow beam members 562 and 563.

Figure 5:
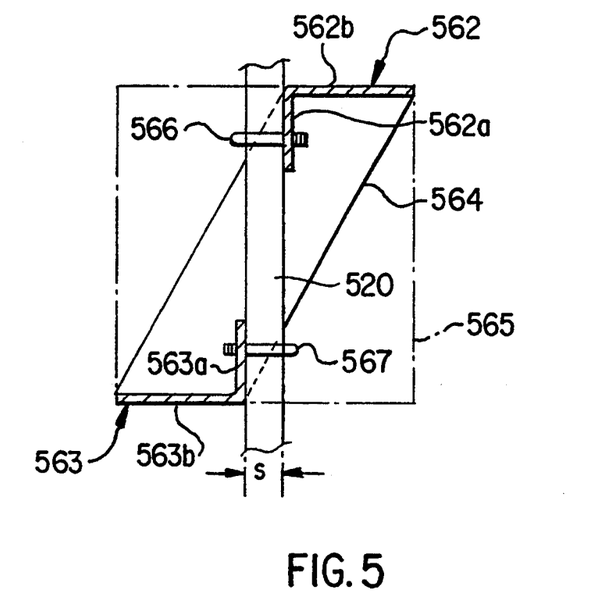
FIG. 5 shows a cross-sectional view of the chisel and sweep mounting assembly of the second embodiment, in which the plow beam end plate is shown in phantom.
Figure 6:
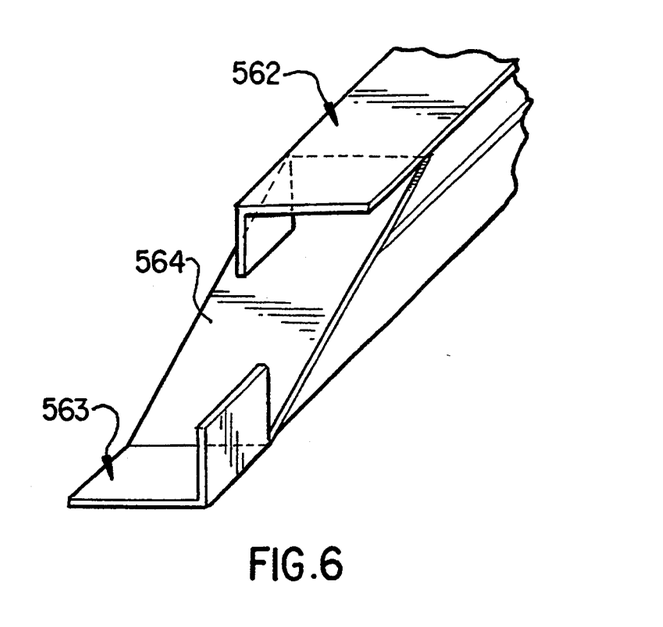
FIG. 6 shows a perspective view of the plow beam and support arrangement of the second embodiment.

In the second embodiment (FIG. 4), both the chisel 50 and the sweep 60 are secured to the plow beam 560 in the same manner. Referring to FIG. 5, the shank portion of the chisel or sweep (shank portion 520 of the chisel is shown by way of example only), is fitted in space S between plow beam members 562 and 563. The shank portion is secured to the respective vertical faces 562a and 563a, for example by U-bolts 566 and 567, respectively. The U-bolts hold the chisel or sweep, as the case may be, securely against vertical or torsional movement. To adjust the height of the chisel or sweep, the U-bolts are loosened and the chisel or sweep is rotated away from the respective vertical faces 562a and 563a. The shank portion can then be moved freely up or down to adjust the height as desired. Finally, the shank portion is rotated back to its vertical position against the respective vertical faces 562a and 563a and the U-bolts are tightened to secure the device to the plow beam.

The embodiment shown in FIG. 4 has a sweep 65 of a simpler construction than that of FIG. 2. A sweep shank portion 651 is a single piece which is secured to the plow beam 560 in the same manner described above for the chisel mounting assembly 56. In all other respects, the sweep 65 is similar to sweep 60 of the first embodiment.

A spring assembly 75 of known type is mounted to the plow beam 560 and to the heave limiter frame members 310a and 310b. The spring assembly comprises a spring 751 and a spring trip bar 752. The spring is pivotally mounted at one end to the plow beam 560. The trip bar is pivotally mounted at one end to the heave limiter frame members 310a and 310b, respectively. The spring and trip bar are pivotally connected to each other at their respective other ends. The spring reset assembly normally exerts a downward force on the plow beam to keep the chisel and sweep in the ground at the desired depth. When the chisel strikes a rock or other object that causes it to lift, the plow beam assembly pivots upwardly about axis 561, thereby tripping the spring assembly. The spring assembly is reset by gravity when the row unit is lifted off the ground.

In operation, the chisel extends below the surface of the soil to loosen compacted topsoil. The cultivator of the invention is designed so that, under normal operating conditions, the chisel 530 can be set to run above the subsoil at a depth of between about 7" and 10". It will be clear that the sets of adjustment holes 540, 542 in the embodiment of FIG. 2 could be readily replaced by a pair of slots to permit continuous vertical adjustment of the shank 520 over a maximum length of travel of any desired distance. Also, depending upon soil conditions, the chisel design may be modified to allow the chisel 530 to run at a greater or a different range of depths. In hard, dry soil conditions, the chisel may be set to run at subsoil depths to break up the compacted layer of soil beneath the surface. This subsurface compacted layer, called the "hard pan", is typically about 2"–4" thick and is typically located about 6"–14" below the surface.

The chisel assembly pivots about the pivot point defined by mounting bolt 556. The chisel assembly is thus able to pivot upwardly when the chisel 530 strikes a large rock or other immovable obstacle or even especially hard packed dirt. This prevents damage to the chisel 530 or shank 520 during operation of the cultivator in the field.

In one presently preferred embodiment, for cultivators running in "no-till" farming conditions, only one pair of sweep wings 640a, 640b is provided on each cultivator 20. For cultivators running in conventional farming conditions, any number of sets of sweep wings may be used. Further, in the embodiment shown in FIG. 2, the outermost row unit has a shorter sweep wing on the outside than on the inside; this outside wing is approximately one-half as long as the inside wing. However, this variation has more to do with the desired outside dimension of the cultivator assembly as a whole than with the operation of the unit.

The cultivator of this invention generally operates in the following manner. The one or more row units 20 are conventionally drawn behind a tractor through a field to be cultivated. In each row unit, the heave limiter wheels 320a, 320b ride on the surface of the ground behind the coulter 40. As the cultivator is drawn forward by the tractor, the coulter 40 cuts through trash and mulch in the field ahead of the chisel assembly 50. The purpose and value of the coulter is described in detail in the above-mentioned Harden et al '916 patent. It should be noted that the coulter assembly 40 may be removed for operation in areas where conventional farming is done, that is, in those areas where mulch and trash has been destroyed by normal tillage operations, so that the field is left relatively clean prior to planting or cultivation.

As can be seen in the drawing figures, the chisel shank 520 is curved forwardly. As the cultivator 20 is constructed and assembled for operation, the chisel point 530 may be located ahead of, directly beneath, or behind the heave limiter wheels 320a, 320b. As the cultivator 20 is drawn forward over the soil surface, the chisel 530 cuts a path through the soil beneath the heave limiter wheels 320a, 320b. The action of the chisel point 530 causes the soil to be forced upwardly, thus causing tremendous down pressure on the heave limiter wheels. In the absence of the heave limiter wheels 320a, 320b, the chisel 530 would tend to throw dirt removed from the cutting path out and away from the cutting path and possibly onto the plant rows. The result would be a ridged field with grooves in the soil. Water would tend to either collect in the grooves or run off down the ridges. This exposed water is subject to faster evaporation than water which has the opportunity to soak into the ground below the surface. Also, when chemicals have been applied in a broadcast manner over the field, this type of soil disturbance would cause the herbicides to be ineffective, due to the fact that untreated strips of ground would remain.

The heave limiter wheels 320a, 320b prevent the soil moved by the chisel 530 from being thrown up and away from the row middle. As the chisel pushes the soil up, it is at the same time pressed down by the heave limiter wheels. The soil is broken up by the chisel, crushed between the chisel and heave limiter wheels, and retained in the row middle. The result is a loose, granular soil pattern in the row middle which retains water and provides aerated paths to accommodate expanded plant root growth.

The operation of the cultivator of this invention creates an aeration of the soil to create a better environment for root growth in the middle of the row. The chisel 530 also breaks up the otherwise hard-packed soil between the plant rows. This allows the plant roots to get access to more water and nutrients than would be possible without such cultivation. Further, without tillage by chisel assembly 50, the hard-packed soil would not retain water well. Using the chisel cultivator of this invention to till and open up the soil allows the soil to retain more water, resulting in higher crop yields, less water runoff, less soil erosion, and less pollution of rivers and streams.

The chisel 530 is located substantially directly below (or slightly ahead of or behind) the heave limiter wheels 320a, 320b. The heave limiter assembly 30 serves multiple purposes. The heave limiter operates to maintain the chisel at a uniform depth of travel through the soil. Since the heave limiter wheels ride on the surface, they prevent the chisel assembly 50 from being dragged down deeper into the soil when soft spots are hit.

It is important to maintain the cultivator at a specific running depth. If the chisel runs deeper than intended, the sweeps will also run deeper. The soil will be loosened to too great a depth. This can cause the tractor to bog down; in removing the tractor from the bog, the crops may be damaged. If the sweep runs too deep, it will not work for its intended purpose. It will run under weed and grass roots and not cut the weed plants from the roots. The heave limiter wheels prevent the chisel (and sweeps) from running too deeply into the soil.

Generally, the chisel creates sufficient suction to keep from being pushed up out of the soil by pockets of hard packed soil. In fact, as the soil hardness increases, so does the downward force acting on the chisel, to thereby keep it in the soil. The suction effect of the chisel is also aided by the overall weight of the cultivator assembly to prevent the chisel (and the sweeps) from running at too shallow a depth.

The heave limiter wheels 320a, 320b substantially minimize soil displacement caused by the chisel action, leaving the broken up soil substantially in place. In the absence of the heave limiter, the chisel assembly 50 would have a tendency to throw dirt removed from the cutting path out and away from the cutting path and onto the plant rows. This can have the detrimental effect of covering the young plants and killing them or inhibiting their growth. Additionally, the dirt thrown up by the chisel contains weed and grass seed. Bringing this seed to the surface and throwing it onto the plant rows results in weed growth in the plant rows that can choke off or stunt plant growth.

In the cultivator of this invention, as the chisel breaks up the hard-packed soil beneath the surface and displaces dirt upward, the forces created between the chisel and the heave limiter wheels causes the soil to be crushed and shattered. The heave limiter keeps this dirt from being thrown out of the middles and onto the plant rows. The heave limiter wheels also keep the displaced soil from forming mounds on either side of the chisel cutting path. This helps to keep water run-off to a minimum. Thus, after the cultivator has made a pass through the field, the cultivated surface soil remains level and relatively even. Additionally, the treated ground is left in place.

The sweep wings 640a, 640b are set to run just under the soil surface behind the chisel shank 520. The height of the sweep wings 640a, 640b is adjustable; the slots 620 permit the height adjustment to be fine tuned. The adjustment of the sweep wings is made relative to the heave limiter wheels; the latter determine the relationship of the cultivator assembly 20 to the soil surface. The depth adjustment of the chisel generally has no significant effect on the height adjustment of the sweep wings. The running depth of the sweep wings is a function of the type of native vegetation in the field. In a field of light young grass, the sweep wings would be set to run at a relatively shallow depth. In a field of sturdy perennial grass, the sweep wings will be set to run deeper. Generally, the sweep depth ranges between 1" and 2" below the surface of the ground.

The sweep wings 640a, 640b are swept back enough to shed roots, debris, etc. displaced by the operation of the cultivator. The debris slides past the sweeps so as not to clog them and prevent their effective operation.

The sweep wings 640a, 640b cut the native vegetation at or near the root (below the soil surface) to inhibit weed growth. The wings act to further aerate the surface soil to help it dry out more quickly and further inhibit weed growth. It is again noted that one or more sweep assemblies may be used, depending upon soil and field conditions. For example, in no-till conditions, generally only a single sweep assembly would be used. But in conventional farming conditions, two or more sweeps would normally be used. Further, if it is desired to throw dirt onto the crop row to cover up weeds and grass in the row, the middle sweep(s) could be run level, and the outside sweep(s) could be angled downwardly to throw dirt out away from the row middle. With a single sweep, the tip of the sweep can be tilted down so that the outer wing tips are high, thereby causing dirt to be thrown out into the crop row.

The cultivator of this invention has been tested in actual field operating conditions. It has been found that crop yields have as much as doubled with use of the cultivator of this invention compared to yields achieved with the use of previously existing cultivators.

While various embodiments of the present invention have been described above, it should be understood that they have been presented by way of example only, and not limitation. Thus the breadth and scope of the present invention should not be limited by any of the abovedescribed exemplary embodiments, but should be defined only in accordance with the following claims and their equivalents.

What is claimed is:

1. A chisel cultivator, comprising:
a substantially rigid frame;
a chisel coupled to said frame so that said chisel penetrates the ground surface during operation of the cultivator for breaking up sub-surface soil and urging the broken up sub-surface soil upwardly toward the surface;
heave limiter means mounted to said frame in a fixed spatial relationship to said chisel so that said heave limiter means presses downwardly on and travels over the surface of the ground during operation of the cultivator for cooperating with said chisel to crush the broken up soil urged upwardly by said chisel and for maintaining the surface of the ground substantially-level following passage of said chisel therethrough;
at least one sweep member mounted to said frame in a fixed spatial relationship to said chisel and located behind and aligned with said chisel relative to the direction of travel of the chisel cultivator, and extending outwardly of a line extending in the direction of operation of the chisel cultivator in a plane substantially orthogonal to the longitudinal axis of said chisel, said chisel configured to create sufficient downward force so that said at least one sweep member travels below the surface of the ground during operation of the cultivator; and
a coulter mounted to the chisel cultivator ahead of said heave limiter means relative to the direction of travel of the chisel cultivator for cutting through trash lying on the surface of the ground during operation of the chisel cultivator.

2. A chisel-cultivator according to claim 1, wherein said heave limiter means comprises a pair of rotatable surface members which are disposed one on either side of a line extending in the direction of travel of the chisel cultivator which passes running through said chisel.

3. A chisel cultivator according to claim 2, wherein said rotatable surface members comprise rubber-tired wheels.

4. A chisel cultivator comprising:
a substantially rigid frame;
a chisel coupled to said frame so that said chisel penetrates the ground surface during operation of the cultivator for breaking up sub-surface soil and urging the broken up sub-surface soil upwardly toward the surface;
heave limiter means mounted to said frame in a fixed spatial relationship to said chisel so that said heave limiter means presses downwardly on and travels over the surface of the ground during operation of the cultivator for cooperating with said chisel to crush the broken up soil urged upwardly by said chisel and for maintaining the surface of the ground substantially level following passage of said chisel therethrough;
at least one sweep member adjustably mounted to said frame in a fixed spatial relationship to said chisel and located behind and aligned with said chisel relative to the direction of travel of the chisel cultivator, and extending outwardly of a line extending in the direction of operation of the chisel cultivator in a plane substantially orthogonal to the longitudinal axis of said chisel, said chisel configured to create sufficient downward force so that said at least one sweep member travels below the surface of the ground during operation of the cultivator;
a coulter mounted to the chisel cultivator ahead of said heave limiter means relative to the direction of travel of the chisel cultivator for cutting through trash lying on the surface of the ground during operation of the chisel cultivator; and
means for adjusting said at least one sweep member relative to said heave limiter means in a direction substantially parallel to the longitudinal axis of said chisel to thereby adjust the depth of penetration of said at least one sweep member into the ground during operation of the chisel cultivator.

5. A chisel cultivator according to claim 4, wherein said at least one sweep member comprises a sweep support member having one end portion coupled to said frame and adjustable relative thereto and at least one substantially flat, wing-like member mounted to a second end portion of said sweep support member.

6. A chisel cultivator comprising:
a substantially rigid frame;
a chisel coupled to said frame so that said chisel penetrates the ground surface during operation of the cultivator for breaking up sub-surface soil and urging the broken up sub-surface soil upwardly toward the surface;
heave limiter means mounted to said frame in a fixed spatial relationship to said chisel so that said heave limiter means presses downwardly on and travels over the surface of the ground during operation of the cultivator for cooperating with said chisel to crush the broken up soil urged upwardly by said chisel and for maintaining the surface of the ground substantially level following passage of said chisel therethrough;
at least one sweep member mounted to said frame in a fixed spatial relationship to said chisel and located behind and aligned with said chisel relative to the direction of travel of the chisel cultivator, and extending outwardly of a line extending in the direction of operation of the chisel cultivator in a plane substantially orthogonal to the longitudinal axis of said chisel, said chisel configured to create sufficient downward force so that said at least one sweep member travels below the surface of the ground during operation of the cultivator;
a coulter mounted to the chisel cultivator ahead of said heave limiter means relative to the direction of travel of the chisel cultivator for cutting through trash lying on the surface of the ground during operation of the chisel cultivator; and
mounting means pivotally mounting said chisel to said frame to permit pivotal movement of said chisel about an axis of rotation substantially parallel to the ground surface and adjustably mounting said chisel to said frame for adjustment of the distance between said heave limiter means and said chisel.

7. A chisel cultivator, comprising:
a substantially rigid frame;
a chisel coupled to said frame so that said chisel penetrates the ground surface during operation of the cultivator for breaking up sub-surface soil and urging the broken up sub-surface soil upwardly toward the surface;
heave limiter means mounted to said frame in a fixed spatial relationship to said chisel so that said heave limiter means presses downwardly on and travels over the surface of the ground during operation of the cultivator for cooperating with said chisel to crush the broken up soil urged upwardly by said chisel and for maintaining the surface of the ground substantially level following passage of said chisel therethrough; and
at least one sweep member mounted to said frame in a fixed spatial relationship to said chisel and located behind and aligned with said chisel relative to the direction of travel of the chisel cultivator, and extending outwardly of a line extending in the direction of operation of the chisel cultivator in a plane substantially orthogonal to the longitudinal axis of said chisel, said chisel configured to create sufficient downward force so that said at least one sweep member travels below the surface of the ground above said chisel during the operation of the cultivator.

8. A chisel cultivator according to claim 6, wherein said line extending in the direction of travel of the chisel cultivator runs through said chisel and wherein said heave limiter means comprises a pair of rotatable surface members which are disposed one on either side of said line.

9. A chisel cultivator according to claim 8, wherein said rotatable surface members comprise rubber-tired wheels.

10. A chisel cultivator comprising:
a substantially rigid frame;
a chisel coupled to said frame so that said chisel penetrates the ground surface during operation of the cultivator for breaking up sub-surface soil and urging the broken up sub-surface soil upwardly toward the surface;

heave limiter means mounted to said frame in a fixed spatial relationship to said chisel so that said heave limiter means presses downwardly on and travels over the surface of the ground during operation of the cultivator for cooperating with said chisel to crush the broken up soil urged upwardly by said chisel and for maintaining the surface of the ground substantially level following passage of said chisel therethrough; and at least one sweep member adjustably mounted to said frame in a fixed spatial relationship to said chisel and located behind and aligned with said chisel relative to the direction of travel of the chisel cultivator, and extending outwardly of a line extending in the direction of operation of the chisel cultivator in a plane substantially orthogonal to the longitudinal axis of said chisel, said chisel configured to create sufficient downward force so that said at least one sweep member travels below the surface of the ground above said chisel during the operation of the cultivator; and means for adjusting said at least one sweep member relative to said frame in a direction substantially parallel to the longitudinal axis of said chisel to thereby adjust the depth of penetration of said at least one sweep member into the ground during operation of the chisel cultivator.

11. A chisel cultivator according to claim 10, wherein said at least one sweep member comprises a sweep support member having one end portion coupled to said frame and adjustable relative thereto and at least one substantially flat, wing-like member mounted to a second end portion of said sweep support member.

12. A chisel cultivator, comprising:
a substantially rigid frame;
a chisel coupled to said frame so that said chisel penetrates the ground surface during operation of the cultivator for breaking up sub-surface soil and urging the broken up sub-surface soil upwardly toward the surface;

heave limiter means mounted to said frame in a fixed spatial relationship to said chisel so that said heave limiter means presses downwardly on and travels over the surface of the ground during operation of the cultivator for cooperating with said chisel to crush the broken up soil urged upwardly by said chisel and for maintaining the surface of the ground substantially level following passage of said chisel therethrough;

mounting means pivotally mounting said chisel to said frame to permit pivotal movement of said chisel about an axis of rotation substantially parallel to the ground surface and adjustably mounting said chisel to said frame for adjustment of the distance between said heave limiter means and said chisel; and at least one sweep member mounted to said frame in a fixed spatial relationship to said chisel and located behind and aligned with said chisel relative to the direction of travel of the chisel cultivator, and extending outwardly of a line extending in the direction of operation of the chisel cultivator in a plane substantially orthogonal to the longitudinal axis of said chisel, said chisel configured to create sufficient downward force so that said at least one sweep member travels below the surface of the ground above said chisel during the operation of the cultivator.

13. A chisel cultivator according to claim 12, further comprising:
a coulter coupled to said frame ahead of said heave limiter means relative to the direction of travel of the chisel cultivator and adapted to cut through trash lying on the surface of the ground during operation of the chisel cultivator.

14. A chisel cultivator according to claim 12, wherein said heave limiter means comprises a pair of rotatable surface members which are disposed one on either side of a line extending in the direction of travel of the chisel cultivator which passes running through said chisel.

15. A chisel cultivator according to claim 14, wherein said rotatable surface members comprise rubber-tired wheels.

16. A chisel cultivator comprising:
substantially rigid frame;
a chisel coupled to said frame so that said chisel penetrates the ground surface during operation of the cultivator for breaking up sub-surface soil and urging the broken up sub-surface soil upwardly toward the surface;

heave limiter means mounted to said frame in a fixed spatial relationship to said chisel so that said heave limiter means presses downwardly on and travels over the surface of the ground during operation of the cultivator for cooperating with said chisel to crush the broken up soil urged upwardly by said chisel and for maintaining the surface of the ground substantially level following passage of said chisel therethrough;

mounting means pivotally mounting said chisel to said frame to permit pivotal movement of said chisel about an axis of rotation substantially parallel to the ground surface and adjustably mounting said chisel to said frame for adjustment of the distance between said heave limiter means and said chisel;

at least one sweep member adjustably mounted to said frame in a fixed spatial relationship to said chisel and located behind and aligned with said chisel relative to the direction of travel of the chisel cultivator, and extending outwardly of a line extending in the direction of operation of the chisel cultivator in a plane substantially orthogonal to the longitudinal axis of said chisel, said chisel configured to create sufficient downward force so that said at least one sweep member travels below the surface of the ground above said chisel during the operation of the cultivator; and means for adjusting said at least one sweep member relative to said heave limiter means in a direction substantially parallel to the longitudinal axis of said chisel to thereby adjust the depth of penetration of said at least one sweep member into the ground during operation of the chisel cultivator.

17. A chisel cultivator according to claim 16, wherein said at least one sweep member comprises a sweep support member having one end portion coupled to said frame and adjustable relative thereto and at least one substantially flat, wing-like member mounted to a second end portion of said sweep support member.

18. A cultivating device comprising:
a tool bar;
a plurality of chisel cultivators coupled to said tool bar, wherein each of said chisel cultivators comprises, a substantially rigid frame;

a chisel coupled to said frame so that said chisel penetrates the ground surface during operation of the cultivator for breaking up sub-surface soil and urging the broken up sub-surface soil upwardly toward the surface;

heave limiter means mounted to said frame in a fixed spatial relationship to said chisel so that said heave limiter means presses downwardly on and travels over the surface of the ground during operation of the cultivator for cooperating with said chisel to crush the broken up soil urged upwardly by said chisel and for maintaining the surface of the ground substantially level following passage of said chisel therethrough; and at least one sweep member mounted to said frame in a fixed spatial relationship to said chisel and located behind and aligned with said chisel relative to the direction of travel of the chisel cultivator, and extending outwardly of a line extending in the direction of operation of the chisel cultivator in a plane substantially orthogonal to the longitudinal axis of said chisel, said chisel configured to create sufficient downward force so that said at least one sweep member travels below the surface of the ground above said chisel during operation of the cultivator.

19. A cultivating device according to claim 18, further comprising means for flexibly coupling each of said chisel cultivators to said tool bar.

20. A chisel cultivator, comprising:

a substantially rigid frame;

a chisel coupled to said frame so that said chisel penetrates the ground surface during operation of the cultivator for breaking up sub-surface soil between crop rows;

depth maintenance means mounted to said frame in a fixed spatial relationship to said chisel so that said depth maintenance means travels over the surface of the ground during operation of the cultivator for maintaining the depth of said chisel; and at least one sweep member mounted to said frame in a fixed spatial relationship to said chisel and located behind and aligned with said chisel relative to the direction of travel of the chisel cultivator, and extending outwardly of a line extending in the direction of operation of the chisel cultivator in a plane substantially orthogonal to the longitudinal axis of said chisel, said chisel configured to create sufficient downward force so that said at least one sweep member travels below the surface of the ground above said chisel during operation of the cultivator.

21. A chisel cultivator according to claim 20, wherein said depth maintenance means comprises at least one rotatable member positioned relative to said chisel so that said at least one rotatable member presses downwardly on the surface of the ground during operation of the cultivator for cooperating with said chisel to crush the broken up soil and for maintaining the surface of the ground substantially level following passage of said chisel therethrough.

* * * * *